(12) United States Patent
Schmitz et al.

(10) Patent No.: US 8,709,249 B2
(45) Date of Patent: Apr. 29, 2014

(54) FILTER

(75) Inventors: Andreas Schmitz, Sulzbach (DE);
Edwin Koch, Tholey (DE); Matthias Schwender, Kirkel (DE); Claudia Brocker, Saarbrücken (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 650 days.

(21) Appl. No.: 12/735,386

(22) PCT Filed: Dec. 18, 2008

(86) PCT No.: PCT/EP2008/010790
§ 371 (c)(1),
(2), (4) Date: Jul. 12, 2010

(87) PCT Pub. No.: WO2009/089891
PCT Pub. Date: Jul. 23, 2009

(65) Prior Publication Data
US 2011/0005990 A1    Jan. 13, 2011

(30) Foreign Application Priority Data

Dec. 18, 2008   (DE) .......................... 10 2008 004 344

(51) Int. Cl.
*B01D 35/00* (2006.01)
*B01D 29/21* (2006.01)
*B01D 39/00* (2006.01)

(52) U.S. Cl.
USPC ..... 210/243; 210/500.1; 210/489; 210/493.2; 361/215; 264/250; 55/487; 55/528; 55/524; 55/527; 55/521; 96/15; 96/17; 96/69

(58) Field of Classification Search
USPC ......... 210/767, 243, 435, 335, 487, 489, 490, 210/493.1, 493.5, 493.4, 504, 505, 508, 210/509, 798, 316, 806, 108, 314, 348; 55/487, 521, 486, 485, 528, 524, 527; 96/15, 17, 69; 95/59, 61; 361/215; 264/250; 427/244
See application file for complete search history.

(56) References Cited

U.S. PATENT DOCUMENTS

| 3,933,643 | A |   | 1/1976  | Colvin et al.           |
|-----------|---|---|---------|-------------------------|
| 5,252,207 | A | * | 10/1993 | Miller et al. .. 210/335 |
| 5,798,048 | A | * | 8/1998  | Ries ............. 210/767 |
| 6,099,726 | A |   | 8/2000  | Gembolis et al.         |

(Continued)

FOREIGN PATENT DOCUMENTS

| DE | 10 2004 005 202 A1 | 8/2005  |
| DE | 600 34 247 T2      | 12/2007 |

(Continued)

*Primary Examiner* — Joseph Drodge
*Assistant Examiner* — Cameron J Allen
(74) *Attorney, Agent, or Firm* — Roylance, Abrams, Berdo & Goodman LLP (57) ABSTRACT

A filter has a filter medium (10) during operation clears fluid, particularly in the form of hydraulic fluid. The filter medium (10) is made of a material such that the potential difference to the fluid to be cleaned is low. The parts of the filter medium (10) have different potentials with respect to each other and/or the fluid to be cleaned such that they cancel each other at least partially, specific dissipation is aspired, or a return of electric charge to the associated filter medium (10) is provided, using a charge equalization situation.

11 Claims, 5 Drawing Sheets

(56) References Cited

U.S. PATENT DOCUMENTS

| | | |
|---|---|---|
| 7,767,086 B2 * | 8/2010 | Koch et al. .................... 210/243 |
| 2003/0167742 A1 | 9/2003 | Kahlbaugh et al. |
| 2004/0245169 A1 * | 12/2004 | Breusch ........................ 210/492 |
| 2007/0028767 A1 * | 2/2007 | Choi et al. ........................ 95/59 |
| 2007/0251875 A1 * | 11/2007 | Koch et al. .................... 210/243 |
| 2009/0078637 A1 | 3/2009 | Shane |

FOREIGN PATENT DOCUMENTS

| | | |
|---|---|---|
| EP | 1 369 160 A1 | 12/2003 |
| JP | 08 038805 | 2/1996 |
| WO | WO 99/52619 A1 | 10/1999 |
| WO | WO 01/37970 A1 | 5/2001 |
| WO | WO 03/033100 A1 | 4/2003 |
| WO | WO 2004/009215 A1 | 1/2004 |

* cited by examiner

FILTER

FIELD OF THE INVENTION

The invention relates to a filter with a filter medium used in operation to clean fluid, particularly in the form of hydraulic fluid.

BACKGROUND OF THE INVENTION

Filters for hydraulic fluid are commercially available and are widely used, for example, in hydraulic systems in system branches through which hydraulic oils as a fluid flow. For a filter design which is stable under pressure, the filter typically has a support tube, preferably of plastic material, provided with perforations and supporting the filter medium used opposite the intended throughflow direction of the fluid. Generally two end caps have the filter medium therebetween and, if necessary, the plastic support tube extends between them. The end caps are likewise preferably made of plastic materials; in particular, the plastic support tube is made as an injection-molded component. In addition, there are also filter solutions in which the support tube is formed from a perforated metal jacket or in which the support tube can also be completely omitted as a support element for the filter medium.

Since, for fixing to the end caps, the filter medium is generally cemented to them in the region of its free ends, the cement used, often in the form of epoxy resin or PU adhesive, produces a type of insulating layer between the filter medium used, the two end caps, and/or the support tube. The insulation effect is further enhanced by the support tube preferably always being made longer than the actual filter medium (mesh pack) so that forces cannot act on it in the longitudinal direction. If this application of forces is not prevented, it cannot be precluded that, as a result of the pressure stresses arising when the fluid is flowing through the filter medium, the filter medium will be damaged. Adequate filtration performance can no longer be ensured.

Electrostatic charges, particularly of the filter medium, occur during fluid passage with possible particulate fouling on the filter medium due to the indicated insulation structure, dictated by insulation layers between the filter medium, the end caps and the support tube. As a result of the potential differences produced in this way within the filter element, discharges can suddenly occur between statically charged filter element parts, especially in the form of the filter medium, and the electrically conductive components, particularly in the form of the typically metallic filter housing in which the filter medium is held, with the result that spark discharges occur. This occurrence must be considered critical with respect to flammability of the fluid media which are to be filtered, such as hydraulic oil, heavy oil fuels, such as diesel fuels, or the like. The spark discharges can also lead to damage to the oil and to sensitive filter medium material. It has furthermore been shown that due to electrostatic charges of oil media, they can age more quickly and must be replaced earlier as part of maintenance.

In order to eliminate these disadvantages, in the generic filter according to DE 10 2004 005 202 A1, it was proposed that at least one of the end caps of the filter and/or at least one end region of the filter medium have a contact-making device and/or the respective end cap itself or parts of it be made electrically conductive for purposes of dissipation of the electrostatic charges which occur especially in operation of the filter. In practice, the known solution, in which the potential differences and charges which arise can be dissipated exclusively by way of the end caps, especially the lower end cap, into the grounding point formed by the housing, should be improved.

SUMMARY OF THE INVENTION

An object of the invention is to provide an improved filter element, specifically to ensure high operating reliability and high stability of pressure values, even at high flow rates of the fluid to be cleaned, such that damaging potential differences cannot occur, especially in operation of the filter element.

This object is basically achieved by a filter where the filter medium is of a material such that its potential difference from the fluid to be cleaned, particularly in the form of hydraulic oil, is low. By using a filter medium which has a low potential to the oil, it is ensured that a large charge cannot be generated. The magnitude of the amount of charge which arises and the associated potential buildup between the filter medium through which the hydraulic oil flows and the oil itself can be influenced in a controlled manner by suitable material selection. For different filter materials intended for the filter medium, the potential which forms between two interacting components, e.g., between the oil and filter medium, can be estimated according to the known electrochemical series. In this procedure, fundamentally very little charge is generated so that the problem of having to dissipate the charge to a grounding point, as shown in the prior art, does not arise at all.

In a second design alternative according to the invention, the considerations for implementation are comparable. In this alternative, parts of the filter medium have different potentials to one another and/or to the fluid to be cleaned such that they at least partially cancel each other out. In this design it is fundamentally considered that the greater the potential difference between two active media, here in the form of individual layers from which the filter medium is built up, the greater the charge generation which occurs between them. It is especially advantageous, therefore not only as in the first version, to use filter layers for the filter medium which have a lower potential compared to the fluid to be cleaned anyway, but also to provide that the first layer of the filter medium has a potential which is positive relative to the fluid to be filtered (oil) and a second following individual layer of the filter medium through which the fluid then flows is chosen from the series of materials with negative potential. The first layer then initially positively charges the fluid, where the second layer negatively charges the fluid. The resulting charges are partially or completely neutralized in this way. This compensation effect also occurs when the fluid to be cleaned is to flow first through the second layer with the negative potential and then the first layer with the positive potential in the reverse sequence.

In another design version according to the invention, there is a filter with a filter medium as one of its components, which is used in operation to clean the fluid, especially in the form of hydraulic fluid (oil). In this design, the filter with its respective components for the controlled dissipation of an electrical charge along a definable path uses at least partially dissipative materials. In this way, a type of compromise between conductive and nonconductive filters is established, as shown in the prior art. The filter design according to the invention accordingly routes the charge away more slowly in time than a conductive filter and would not charge the fluid (oil) too highly in operation. At the same time the hazard of a discharge, as in nonconductive dissipation, is minimized since a high field intensity in the filter element cannot build up due to the slow dissipation which is induced in a controlled manner.

Preferably materials with a conductivity between $10^3$ and $10^9$ $\Omega m$ are used as the dissipative region.

In a fourth design version according to the invention, the throughflow direction of the fluid through the filter medium downstream, a charge equalization layer is associated with the filter medium and at least partially returns the electrical charge of the fluid which arises to the associated filter medium. This charge equalization layer, which can also be formed by a coating on the filter medium, thus reduces the charging of the fluid and of the filter medium and in this way prevents discharges in the filter.

In one preferred embodiment of the four design versions, the filter medium is mixed with conductive fibers or different conductive components so that the filter medium is conductive and the charge can be quickly discharged to the filter housing and thus against "ground." In order to stabilize the filter medium, the indicated components or fibers are preferably made in the form of a matrix structure.

In order to attain a high effective filter surface, the filter medium is preferably made pleated and is supported between two end caps of the filter, at least in the inner region on a fluid-permeable support tube.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
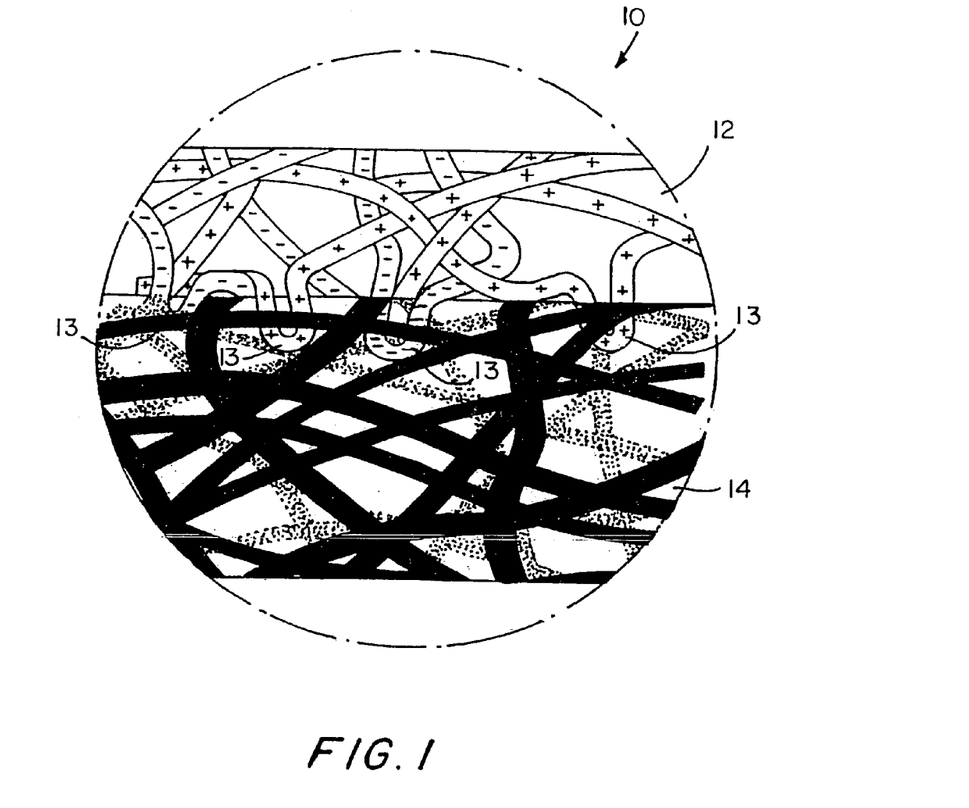
FIG. 1 is a perspective view of a filter in a partially cutaway state according to an exemplary embodiment of the invention.
Figure 2:
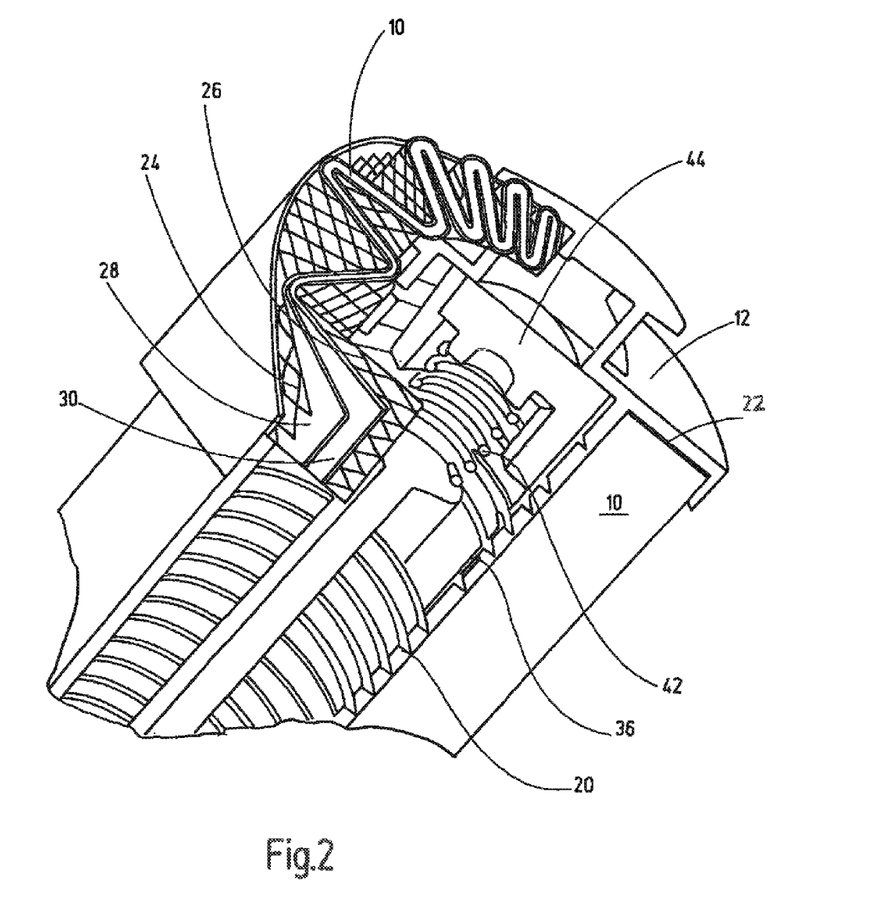
FIG. 2 is a perspective view partially cutaway form the upper part of the filter as shown in FIG. 1, with a better representation due to the unfolded individual layers of the filter medium used according to the exemplary embodiment of the invention.

First, the fundamental structure of a filter, as can be used for these design versions according to the invention, is detailed using FIGS. 1 and 2. Regardless, the filter can also have a different structure, especially in the manner of a planar filter material or filter plate, as are used for example for stack filters. The filter presented here is structured in the manner of a filter element and has a filter medium 10 which extends between two end caps 12, 14. Each end cap is connected to an associatable end region 16, 18 of the filter medium 10 which is supported otherwise on the inner peripheral side on a fluid-permeable support tube 20. In particular the filter medium 10 can be connected to the end caps 12, 14 on the end regions 16, 18 by a cement or adhesive layer 22.

For cleaning purposes, the fluid passes through the filter from the outside to the inside, and therefore, through the filter medium 10. For the sake of simplicity, the filter medium 10 is shown in FIG. 1 as a cylindrical filter mat part, a quite practicable version. Preferably, the filter medium 10 is made pleated according to the partial representation as shown in FIG. 2, extending in the form of filter folds around the support tube 20. As further follows from FIG. 2, the filter medium 10 is made in several layers. In particular the multilayer structure has an outer support layer 24 which is used especially in the form of a net or fabric for stabilization of the other layer structure. There can be an inner support layer 26 comparable to the outer support layer 24. Furthermore, there are a prefilter layer 28 and a main filter layer 30. Between the outer support layer 24 and prefilter layer 28 and between the main filter layer 30 and the inner support layer 26, an inflow-side nonwoven (not detailed) or a correspondingly made outflow-side nonwoven (likewise not shown) can be used for mechanical protection of the filter layers. A six-layer or other multilayer structure of the filter medium is conventional in the prior art so that it will not be further detailed here. Since modern filters are made largely of plastic materials for reasons of weight and recycling, this invention is fundamentally associated with the problem of increasing static charging and the already described adverse triboelectric effects that can arise.

In further explanation of the filter as shown in FIG. 1, each respective end cap 12, 14 is provided to the inside and outside with a projecting ring surface 32 which integrates the associatable cement bed 22 between them. Both the end caps 14, 16 and the support tube 20 are preferably made as plastic injection mold components.

Within the support tube 20 along its circular segments, which border the fluid passage sites, a separating segment 34 is suitable suspended or clipped in at a connecting site 36. The individual partitions 38 of the pertinent segment 34 viewed from the top are made in the manner of a three-pointed star and otherwise optimize flow routing within the filter in the direction of one passage site 40 in the region of the lower end cap 14 via which the cleaned fluid leaves the filter. Viewed in the direction of FIG. 1 and in an extension to the top, the separating segment 34 has a plate-like closing body 44 (FIG. 2) which is acted upon by a compression spring 42 that assumes a bypass function such that when the filter medium 10 is clogged, the uncleaned fluid can enter the interior of the filter by the diametrically opposite entry sites 46 in the upper end cap region 12 for flow through the filter and exit in the direction of the lower passage site 40. The bypass function is adjustable in terms of its trigger behavior by the definable spring force of the compression spring 42.

With the solutions according to the invention, it is at least possible, even for pure plastic elements or in those filters which are made predominantly of plastic materials, to address the problem of static charging. The modification does not limit the pressure stability values, beta values, filtration rates, etc., as will be illustrated accordingly by the following.

The various design versions are detailed below using a fluid in the form of hydraulic oil. In this respect, the illustrated filter as shown in FIGS. 1 and 2 constitutes a hydraulic filter, these filters of course being able to also clean other fluids including gases by removing particulate fouling. The basic prerequisite for the described functions is that the fluid in itself is not conductive, but when it passes through the filter it can experience electrostatic charging which can lead to the already described adverse effects in the subsequent fluid circuit. For example, entrained charges can cause the oil to age more quickly or can destroy the filter entirely. The design versions to be explained, each viewed for itself, lead either to electrostatic improvement, or in combination with one or more other versions together the electrostatic behavior of the fluid system is improved.

In the first two design versions, material combinations with a different potential to the oil are used. Thus, on the one hand filter materials can be used which have a low potential to the oil so that a large charge cannot be generated. On the other hand the use of several filter materials is possible which have different potentials to the oil and thus can partially or completely neutralize the electrical charge of the oil. To the extent filter materials are addressed, they can form the entire filter medium 10. It is also possible that only individual layers, such as the prefilter layer 28 or the main filter layer 30, are provided with these filter materials or are made entirely of them.

The magnitude of the amount of charge which arises and the potential buildup between the filter medium 10 through which the oil flows and the oil can be influenced in a controlled manner by suitable material selection. The potential which forms between two materials, in this case between the oil and filter medium, can be estimated according to the electrochemical series as shown in the following table. If two different materials are brought into contact, a potential forms between them. If, for example, an elastomer silicone material, which is at the very top in the triboelectric chemical series in positive polarity, is brought into contact with polytetrafluoroethylene, which is described as the most negative in this electrochemical series, the potential between these two is maximum and electrons begin to flow from the negative polytetrafluoroethylene to the positive elastomer silicone material in order to undertake the desired charge equalization.

TABLE

Triboelectric Voltage Series of the Elements

| Material | Polarity |
| --- | --- |
| Silicone elstomer with silica filler | Positive |
| Borosilicate glass, fire polished | ↑ |
| Window glass | |
| Aniline-formal resin (acid catalyzed) | |
| Polyformaldehyde | |
| Poly(methyl methacrylate) | |
| Ethyl cellulose | |
| Polyamide II | |
| Polyamide 6-6 | |
| Rock salt, NaCL | |
| Melamine formal | |
| Wool, knitted | |
| Silica, fire polished | |
| Silk, woven | |
| Poly(ethylene glycol succinate) | |
| Cellulose acetate | |
| Poly(ethylene glycol adipate) | |
| Poly(diallyl phthalate) | |
| Cellulose (regenerated) sponge | |
| Cotton, woven | |
| Polyurethane elastomer | |
| Styrene-acrylonitrile copolymer | |
| Styrene-butadiene copolymer | |
| Polystyrene | |
| Polyisobutylene | |
| Polyurethane flexible sponge | |
| Borosilicate glass, ground surface | |
| Poly(ethylene glycol terephthalate) | |
| Polyvinylbutyral | |
| Formaldehyde-phenol-hardened epoxide resin | |
| Polychlorobutadiene | |
| Butadiene-acrylonitrile copolymer | |
| Natural rubber | |
| Polyacrylonitrile | |
| Sulfur | |
| Polyethylene | |
| Poly(diphenylol propane carbonate) | |
| Chlorinated polyether | |
| Poly(vinyl chloride) with 25% DOP | |
| Poly(vinyl chloride) without plasticizer | |
| Polytrifluorochloroethylene | ↓ |
| Polytetrafluorocthylene | Negative |

In summary, it therefore remains to be stated that the greater the potential difference between two substances, i.e., the farther apart they are in the aforementioned table, the greater the charge generation between them. This electrochemical series fundamentally also applies to the fluid (oil) to be treated and the material of the filter medium 10. For the filter element 10 or its individual filter layers this means that the filter materials to be used must be chosen such that the potential difference between them and the oil be as small as possible, i.e., that oil and the filter material are as close to one another as possible in the table. In this way fundamentally less charge is generated, which then does not need to be dissipated to a grounding point. It has proven especially advantageous, in order to obtain an electrostatically optimized filter, that glass fiber materials which cannot charge the oil to such a degree be used for the respective filter layer 28, 30.

Figure 3:
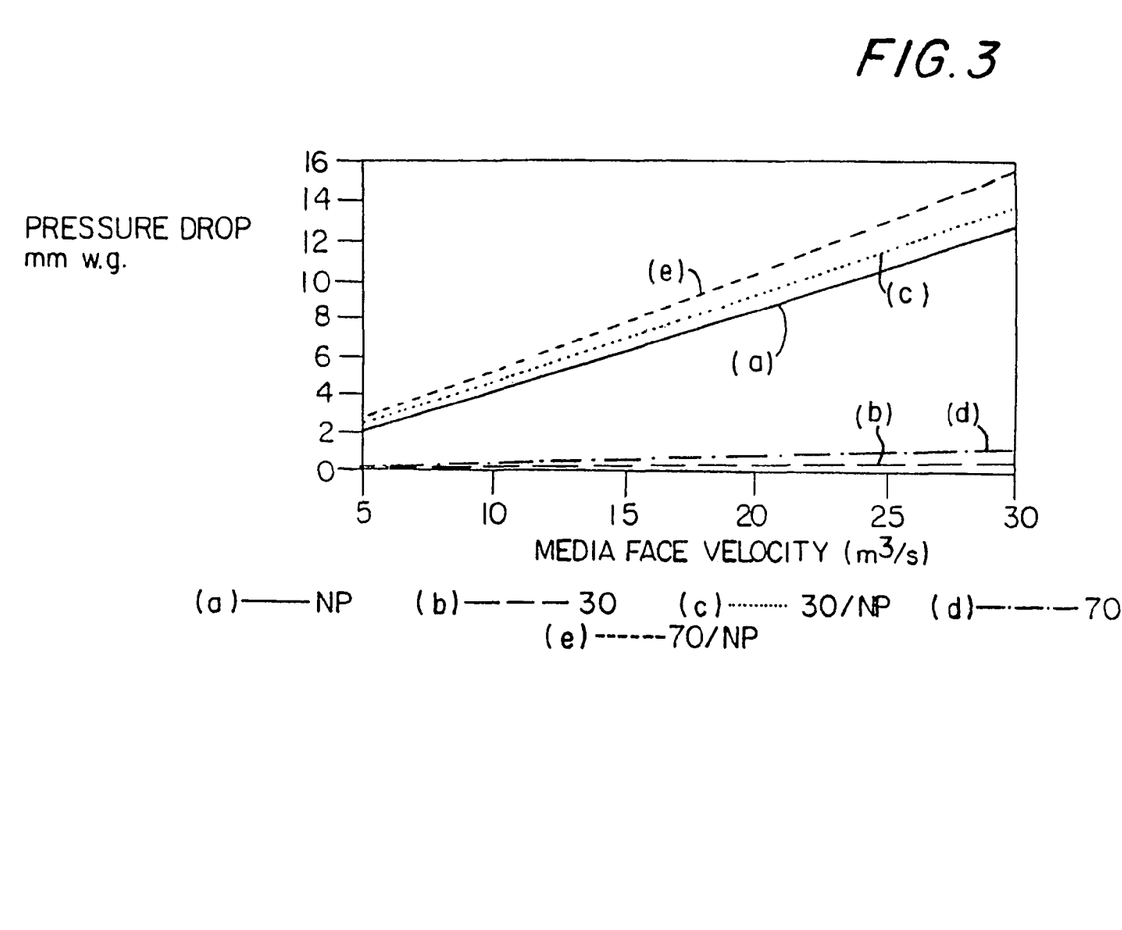
FIGS. 3 to 5 show different graphs illustrating the fluid charging and discharging effects in connection with a filter according to an exemplary embodiment of the invention.

These conditions are shown, for example, in FIG. 3, this figure showing the voltage in the oil after flowing through different glass fiber materials, depending on the average pore size. Depending on the glass fiber material used, the voltage then approaches zero.

Figure 4:
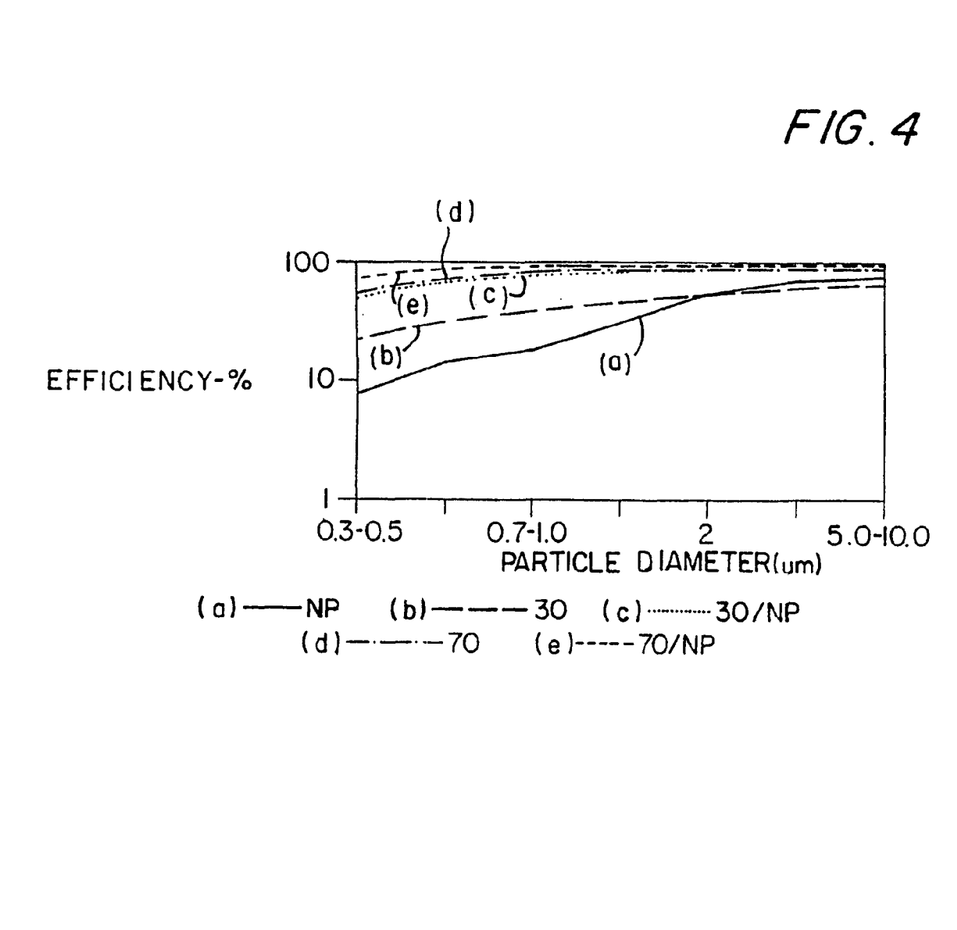
Figure 5:
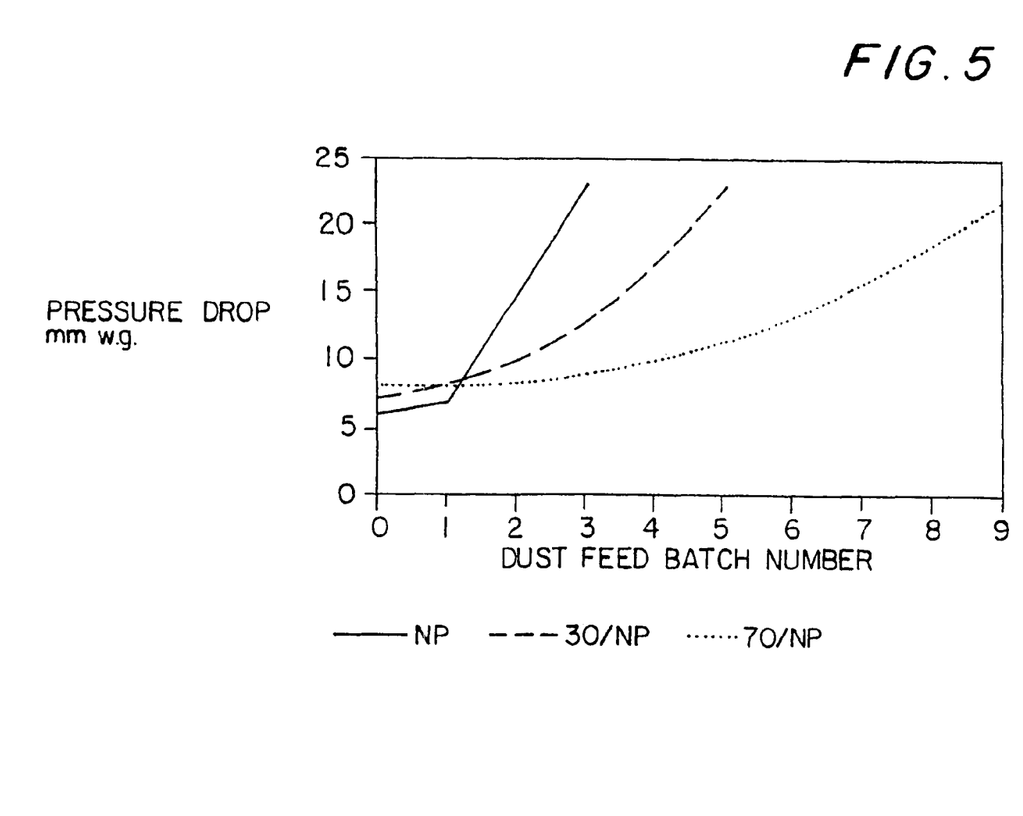

In another step it is now possible to combine filter layers with one another which already have a lower potential to the oil so that the resulting charges can be additionally neutralized. Thus, for example, the first layer (prefilter layer 28) through which the oil flows first can have a positive potential to the oil and in this respect is above the oil in the table. Conversely, the second layer as the main filter layer 30 through which the oil then flows has a negative potential and therefore is below the oil in the table. The first layer 28 then positively charges the oil, and the second layer in turn negatively charges it. The charges which have been generated in this way should be able to be partially or completely neutralized, and damaging effects are completely avoided. In FIG. 4 this voltage is plotted over the temperature in the oil after flowing through a glass filter layer as a prefilter layer 28, and the voltage is positive in this case. In the following FIG. 5, the voltage is plotted over the temperature in the oil after flowing through a plastic filter layer (polyester) as the main filter layer 30; in this case the voltage is negative. Of course these compensation effects also occur when the layers of material are swapped with one another or when the oil assumes an opposite throughflow direction. As FIGS. 4 and 5 illustrate, the oil is therefore charged oppositely in the two different materials. If at this point these two layers are combined with one another as shown, by their being placed in succession or by the oil being allowed to flow through them in succession (stack filter arrangement), the resulting charges will be partially or entirely neutralized. It is also possible to join together the fibers of the respective individual layer in the manner of a matrix, for example as a mixture of fibers of different type, in order to achieve the desired triboelectric effects.

Other materials which can be combined with one another based on different potentials to the oil (either as different layers or in the form of the indicated matrix) are, for example, glass fibers, synthetic material (for example, meltblown, spunlace, spunbonds, nonwovens; material type: polyester, polypropylene, polyamide, polycarbonate), metal gauze, sintered metal, metal nonwoven, carbon fibers, cellulose, etc. Advantageous combination versions would be, for example:
Glass—synthetics
Glass—cellulose
Glass—metal
Synthetic—cellulose
Synthetic—metal
Cellulose—metal
Glass—synthetic—cellulose
Glass—synthetic—metal
Glass—cellulose—metal
Synthetic—cellulose—metal The sequence of different materials in the throughflow direction is irrelevant, as already described.

Another design version is based on the defined dissipativity of the overall system. The idea is therefore defined dissipation of the charge from the filter medium 10 to the actual filter housing (not shown). Defined dissipation here is intended to mean that an average conductivity of the materials in the filter is chosen which provides for the charge being able to "escape" from the filter at a moderate rate.

Fundamentally, there have been two types of filters or filter elements on the market to date. They are conductive and nonconductive filters. In the conductive filters the charge generated between the filter medium and the oil in the filter is dissipated to the housing by way of metallic filter element components, such as wire gauze, the support tube, or end caps which are in electrical contact with one another. This design is shown, for example, in DE 10 2004 005 202 A1. The disadvantage of this solution is that the highest charging arises for the oil since the charge removed from the oil can be continuously discharged by way of the filter medium to the housing so that equilibrium or saturation cannot be established in the filter. The oil continuously delivers a new charge to the filter medium, and the oil thus leaves the filter highly charged. This charging can lead to rapid aging of the oil. However, a charge cannot build up in the filter since it is routed away via the conductive components of the filter, with the result that discharges in the filter which could destroy the filter materials are largely precluded.

In the other known design form, the filter is not made conductive, i.e., the charge generated between the respective filter material and oil in the filter is not dissipated to the filter housing. For correspondingly large amounts of charge then the potential builds up in the filter, and ultimately discharges occur between the filter and a grounding point, such as, for example, the associated filter housing. Furthermore, discharges can occur within the filter between sites with different potential. This discharge damages the filter medium and effective filtration would no longer be ensured. There is especially the risk that the filter will charge and reach a critical field intensity, when the saturation point is above the critical field intensity. Then, spark-overs occur in the filter or from the filter to the grounding point, such as, for example, the filter housing.

Conversely, it is advantageous for purposes of the design according to the invention that the charge remain in the filter and cannot be routed away, so that an equilibrium state occurs in which the filter is charged up to a certain value. If this value is below the indicated critical field intensity at which discharges occur, the oil is not further charged. The charge in the oil which leaves the nonconductive filter is therefore smaller than the charge in the oil which leaves a conductive filter element. In the design version according to the invention, a compromise is accordingly sought between a conductive and a nonconductive filter element, and it is provided that the charge be routed away more slowly than a conductive filter in order to therefore not charge the oil to such a high degree. At the same time, the danger of a discharge as in a nonconductive filter element is minimized, since a high field intensity in the filter element cannot build up due to the slow dissipation. Filter materials which meet this requirement are called dissipative.

The following relationships apply:

Nonconductive region $>10^9$ $\Omega$m no electron transport possible

Dissipative region $10^3$-$10^9$ $\Omega$m slow electron transport

Conductive region $<10^3$ $\Omega$m fast electron transport

Practical implementation of this idea is substantiated in an element structure as shown in FIGS. 1 and 2. In order to ensure the desired dissipativity, at least part of the illustrated filter must be equipped to be dissipative, such as, for example, the end cap 14, 16 which is generally provided with an O-ring (not shown), some other dissipating gasket (not shown), the support tube 20 itself or part thereof, as well as the mesh pack arrangement in the form of the pleated filter medium 10 or one or more layers 28, 30 of the mesh pack. Therefore a defined path is stipulated which the electrical charge can follow through dissipative parts. This path should extend from the filter medium 10 as far as to the housing in which the filter has been inserted. This path of dissipative material can also be penetrated by conductive components since the material which determines the speed is the least conductive. Therefore, the path should fundamentally not be interrupted by nonconductive materials. Preferred transport paths would, for example, be formed proceeding from the filter medium 10 via the support tube 20 and the end cap 12, 14, 16 to the filter housing, which is not shown in detail.

Another design version uses a charge equalization layer behind the oil-charging filter layer 28 and/or 30. The charge equalization layer, which is not detailed in FIGS. 1 and 2, returns the charge from the oil to the respectively upstream filter layer 28, 30. The charge equalization layer thus reduces the charging of the oil and of the filter and prevents discharges in the element structure.

As already described, the oil which is flowing through a filter layer is electrically charged. The oil is then either positively or negatively charged, and the respective filter layer or the entire filter is charged oppositely to the oil. If at this point a conductive or dissipative equalization layer is placed behind the filter layer through which flow is taking place so that it has electrical contact to the filter layer, the oil charge when leaving the respective filter layer 28, 30 is transmitted in whole or in part to the equalization layer. The equalization layer can in turn return the layer to the oppositely charged filter layer 30 and 28. In this way oil charging and element charging are reduced or extinguished. Electrostatic discharges can be reliably avoided in this way.

In one preferred embodiment, for this design version both the prefilter 28 and also the main filter layer 30 are made of glass fiber materials. The conductive or dissipative equalization layer can then be located either behind the main filter 30 or behind every other layer (since each layer can electrically charge the oil). The material can be a conductive or dissipative nonwoven, fabric, net, or other knit which could be formed of, for example, a plastic such as polyester, glass, or cellulose as the main component which is then coated to be conductive or dissipative or which inherently has intrinsic conductivity or dissipativity. It would also be conceivable to vapor-deposit this equalization layer onto another layer or apply it in some other way (doctoring). A vapor-deposited layer could be formed of, for example, aluminum material. The equalization layer need not have electrical contact to the end cap 14, 16 or to the support tube 20. In any case, it also works with this electrical contact.

In particular, the design version which uses a conductive or preferably dissipative equalization layer can be further improved by a matrix of conductive filter material being built up. The basic idea is to mix the filter material used with conductive fibers or conductive components of a different form so that the filter material is conductive and can quickly release the charge to the filter housing and thus against ground. The design under discussion can, however, also be used to the extent the filter is insulated. The filter material with the conductive matrix can be a mixture of conventional filter material such as, for example, plastic (polyester), glass fibers, cellulose, and conductive additives, such as, for example, carbon or high-grade steel. The prefilter layer 28 can be built up especially preferably from glass fiber materials and the main filter layer 30 from carbon in conjunction with a glass fiber matrix.

All these design versions lead to electrostatically optimized filter elements which prevent rapid oil aging and counteract the adverse effect of electrostatic charging to relieve hydraulic circuit systems.

While various embodiments have been chosen to illustrate the invention, it will be understood by those skilled in the art that various changes and modifications can be made therein without departing from the scope of the invention as defined in the appended claims.

What is claimed is:

1. A filter for cleaning oil, comprising:
a housing containing oil to be cleaned; and
a filter element with a filter medium and with end regions and a support tube in said housing, said filter medium including several individual layers of filter materials, said filter materials having different electrical potentials relative to the oil to be cleaned due to electrostatic charging to at least partially neutralize an electric charge of the oil, components of said end regions and said support tube being of at least partially dissipative materials for controlled dissipation of an electrical charge along a definable path.

2. A filter according to claim 1 wherein
said layers of filter materials have different electrical potentials relative to one another.

3. A filter according to claim 1 wherein
said dissipative materials have a conductivity between $10^3$ and $10^9$ $\Omega$m.

4. A filter according to claim 3 wherein
said definable path comprises individual path segments with at least one of different dissipativity and different conductivity setting a speed for removal of electrical charges.

5. A filter according to claim 1 wherein
said definable path comprises individual path segments with at least one of different dissipativity and different conductivity setting a speed for removal of electrical charges.

6. A filter according to claim 1 wherein
a charge equalization layer is downstream of said filter medium in a throughflow direction of the oil through said filter medium and returns a resulting electrical charge of the oil at least partially to said filter medium.

7. A filter according to claim 1 wherein
said filter medium is mixed with conductive fibers.

8. A filter according to claim 7 wherein
said conductive fibers form a conductive matrix.

9. A filter according to claim 1 wherein
said layers of said filter medium form a prefilter and a main filter.

10. A filter according to claim 9 wherein
said filter medium comprises at least one of a protective layer and a stabilization layer.

11. A filter according to claim 10 wherein
said filter medium comprises a pleated filter mat surrounding a fluid-permeable support tube and having end caps on longitudinal ends of said filter mat.

\* \* \* \* \*

UNITED STATES PATENT AND TRADEMARK OFFICE
CERTIFICATE OF CORRECTION

| | | |
|---|---|---|
| PATENT NO. | : 8,709,249 B2 | Page 1 of 4 |
| APPLICATION NO. | : 12/735386 | |
| DATED | : April 29, 2014 | |
| INVENTOR(S) | : Andreas Schmitz et al. | |

It is certified that error appears in the above-identified patent and that said Letters Patent is hereby corrected as shown below:

On the title page, the drawing should be replaced with the drawing of attached Fig. 1.

In the Drawings

Figs. 1 and 3-5 should be replaced with the attached drawing Figs. 1 and 3-5.

Signed and Sealed this
Ninth Day of September, 2014

Michelle K. Lee
*Deputy Director of the United States Patent and Trademark Office*

(12) United States Patent
Schmitz et al.

(10) Patent No.: US 8,709,249 B2
(45) Date of Patent: Apr. 29, 2014

(54) FILTER

(75) Inventors: Andreas Schmitz, Sulzbach (DE); Edwin Koch, Tholey (DE); Matthias Schwender, Kirkel (DE); Claudia Brocker, Saarbrücken (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 650 days.

(21) Appl. No.: 12/735,386

(22) PCT Filed: Dec. 18, 2008

(86) PCT No.: PCT/EP2008/010790
§ 371 (c)(1),
(2), (4) Date: Jul. 12, 2010

(87) PCT Pub. No.: WO2009/089891
PCT Pub. Date: Jul. 23, 2009

(65) Prior Publication Data
US 2011/0005990 A1  Jan. 13, 2011

(30) Foreign Application Priority Data
Dec. 18, 2008  (DE) .................. 10 2008 004 344

(51) Int. Cl.
*B01D 35/00* (2006.01)
*B01D 29/21* (2006.01)
*B01D 39/00* (2006.01)

(52) U.S. Cl.
USPC ..... 210/243; 210/500.1; 210/489; 210/493.2; 361/215; 264/250; 55/487; 55/528; 55/524; 55/527; 55/521; 96/15; 96/17; 96/69

(58) Field of Classification Search
USPC ......... 210/767, 243, 435, 335, 487, 489, 490, 210/493.1, 493.5, 493.4, 504, 505, 508, 210/509, 798, 316, 806, 108, 314, 348; 55/487, 521, 486, 485, 528, 524, 527; 96/15, 17, 69; 95/59, 61; 361/215; 264/250; 427/244
See application file for complete search history.

(56) References Cited

U.S. PATENT DOCUMENTS

| | | | |
|---|---|---|---|
| 3,933,643 A | 1/1976 | Colvin et al. | |
| 5,252,207 A * | 10/1993 | Miller et al. | 210/335 |
| 5,798,048 A * | 8/1998 | Ries | 210/767 |
| 6,099,726 A | 8/2000 | Gembolis et al. | |

(Continued)

FOREIGN PATENT DOCUMENTS

| | | |
|---|---|---|
| DE | 10 2004 005 202 A1 | 8/2005 |
| DE | 600 34 247 T2 | 12/2007 |

(Continued)

*Primary Examiner* — Joseph Drodge
*Assistant Examiner* — Cameron J Allen
(74) *Attorney, Agent, or Firm* — Roylance, Abrams, Berdo & Goodman LLP (57) ABSTRACT

A filter has a filter medium (10) during operation clears fluid, particularly in the form of hydraulic fluid. The filter medium (10) is made of a material such that the potential difference to the fluid to be cleaned is low. The parts of the filter medium (10) have different potentials with respect to each other and/or the fluid to be cleaned such that they cancel each other at least partially, specific dissipation is aspired, or a return of electric charge to the associated filter medium (10) is provided, using a charge equalization situation.

11 Claims, 5 Drawing Sheets

UNITED STATES PATENT AND TRADEMARK OFFICE
CERTIFICATE OF CORRECTION

PATENT NO. : 8,709,249 B2
APPLICATION NO. : 12/735386
DATED : April 29, 2014
INVENTOR(S) : Andreas Schmitz et al.

It is certified that error appears in the above-identified patent and that said Letters Patent is hereby corrected as shown below:

On the title page,

"(30) Foreign Application Priority Data
Dec. 18, 2008 (DE) .................................. 10 2008 004 344"

should read

"(30) Foreign Application Priority Data
Jan. 15, 2008 (DE) ................................. 10 2008 004 344"

Signed and Sealed this
Twenty-third Day of December, 2014

Michelle K. Lee
*Deputy Director of the United States Patent and Trademark Office*